2,961,344
METHOD OF TREATING A WOVEN GLASS FABRIC WITH A WATER SOLUBLE SALT OF A PARTIALLY DEACETYLATED CHITIN

Ira S. Hurd and George M. Haynes, Spartanburg, S.C., assignors to Moretex Chemical Products Inc., Spartanburg, S.C., a corporation of South Carolina No Drawing. Filed Feb. 1, 1957, Ser. No. 637,635

8 Claims. (Cl. 117—126)

This invention relates to the surface treatment of glass fibers and textile materials composed of glass fibers with agents which make it possible for said fibers and textile materials to be dyed and improves or develops other desirable characteristics.

Glass fabrics have been known long as a major textile material because of the many desirable physical properties they possess, such as their resistance to heat, weather, chemical, and micro-organism attack. Two primary faults of glass fabrics are their resistance to dyeing and basic unsatisfactory ability to withstand mechanical handling incident to washing. Various resin-pigment systems have been applied as coatings to fiber in efforts to overcome these faults, but with indifferent degrees of success. The chemistry of dyeing, finishing, and printing as well as processing techniques are highly developed and described in the literature in detail. In most instances, these conventional techniques and compositions have proved expensive and given non-durable finishes, in addition to their involving many steps in the processing.

An object of this invention is to provide a surface finish for glass fibers and textiles which will improve the hand of said fibers and textiles.

Another object of this invention is to provide a permanent and durable finish to glass fibers or fabrics which can be dyed with a wide variety and range of colors.

Another object of the invention is the provision of a process for the treatment of glass fibers or fabrics with a polymeric mordant for direct, acid and azo dyes which is permanent and washable.

Another is the provision of a process for the treatment of glass fabrics with a polymeric dye mordant to also impart distortion stability to said glass fabrics.

A further object of this invention is the provision of a composition, characterized by its containing partially deacetylated chitin, and a process for its application to glass fibers and fabrics to impart to said materials improved dyeing characteristics, improved distortion stability, and a desirable hand or drape.

Yet another object of this invention is the provision of a novel coating for glass fibrous materials having a substantive affinity for dyes so that the resulting dyed material treated therewith may be washed or dry cleaned without excessive loss of shade.

Other objects and advantages of this invention will in part be obvious and in part appear from the following detailed description.

The present invention involves the discovery that partially deacetylated chitin will, when applied to glass fibers or fabrics in accordance with the steps of this invention, form a permanent coating, with many available dye sites for the absorption of a wide variety of dye classes and colors of these classes, thereby creating a new product, namely, a glass fiber or textile having all the physical characteristics inherent in glass fibers and textiles, enhanced with improved hand and the chemical capacity to receive dyes of all classes. In addition, the coating thus applied will, when applied to fabrics impart a high degree of fiber to fiber bonding and increase distortion stability, abrasion resistance, and improve the general appearance and hand of said fabric.

The invention, accordingly, is embodied in the method of making glass fibers dye receptive and the steps and compositions embodied in the method as more particularly set forth in the following general description and specific examples.

Partially deacetylated chitin is available as a commercial product and may be prepared in substantially pure form by the process disclosed in U.S. Patent 2,040,879, Rigby, issued May 19, 1936. The deacetylated chitin prepared by this method is the derivative which is characterized containing from at least about 0.2 to about 0.9 free amino group per chitosamine residue. The use of derivatives containing about 0.7 to 0.9 free amino group per chitosamine unit of the molecule is preferred.

Useful solutions of deacetylated chitin salts for purposes of this invention may be obtained according to the processes of the said patent or other known processes.

In carrying out the process of this invention the partially deacetylated and substantially undegraded chitin is dissolved in an aqueous acid solution, which acid is capable of forming a water soluble salt with the deacetylated chitin. For example, the partially deacetylated chitin can be dissolved in aqueous solutions of monobasic aliphatic acids or aliphatic and aromatic polybasic acids to form transparent and colorless solutions with convenient viscosities for the padding of textile materials with conventional textile machinery. The preferred acids are acetic, formic, diglycolic, oxalic, tartaric, and adipic acids. A water solution containing 1 part of partially deacetylated chitin and 1 part acid to 98 parts of water is a convenient padding solution for the glass fabric. Such a solution can be prepared readily at room temperature in conventional equipment.

The glass fibers or fabrics are then padded with this solution by immersing the fabric in the solution and subsequently passing the wet fabric through squeeze rolls to remove excess solution. The treated fabric is then dried at conventional fabric drying temperatures, i.e., 100–220° F., and subjected to a heat treatment to insolubilize the precipitated or deposited finish, which is characterized by its being formed principally of the partially deacetylated chitin salt, at elevated temperatures preferably about 250–275° F. The treated fabric or fibers can then be dyed by conventional methods in conventional textile equipment with any desired colors to give desirable effects.

Various softeners and plasticizers can be incorporated with the treating solution or as an after treatment to give desirable effects such as soil resistance, abrasion resistance, appearance, and drape.

It has further been found that the incorporation of an aldehyde or aldehyde donor in the treating solution will improve the durability of the finish and its resistance to water. Such materials include formaldehyde and formaldehyde donors, such as paraformaldehyde, hexamethylene tetraamine and monomethylol dimethyl hydantoin.

Examples of suitable softeners and plasticizers that can be used are the various cationic and nonionic fatty derivatives or acid stable emulsions of paraffin and synthetic polymers. The preferred softener is a water dispersible cationic emulsion system of low molecular weight polyethylene, such as Solvay's AC Polyethylene 629 or Eastman's Polyethylene E. The preferred emulsifying agent is a tallow amine acetate sold commercially as Armac T. Virtually any softener of merit can be applied as an after treatment. It is preferred that any softener which is applied be applied as an after treatment just after drying and just before curing the treated fabric or fiber.

In order to further illustrate our invention, but without being limited thereto, the following examples are given. In each of the examples the glass fabric used was a white coronized plain weave drapery fabric.

*Example I*

A sample of white glass fabric padded by immersing the fabric in a solution containing 1 part partially deacetylated chitin, 1 part diglycolic acid, 1 part monomethylol dimethyl hydantoin, and 90 parts of water was passed through squeeze rolls to remove excess solution and to give an even application. The fabric was then dried at 140° F. and subjected to a heat cure at 275° F. for 5 minutes. The fabric was then dyed in a water solution containing 1 part Congo red, 5 parts sodium sulfate, and 94 parts of water. It was soaked in the dye solution at 160° F. for 10 minutes and then rinsed with water until the rinse water contained no dye. The dyed fabric was a smooth deep red with very little loss of shade after a launder in a rotary home machine at 120° F. with 0.1% neutral soap solution. Very little distortion of the fabric was observed after this drastic treatment.

An untreated piece of the same glass fabric was subjected to the same dye treatment with no color absorption at all observed. Also, an untreated piece of the same glass fabric was subjected to the same laundering operation, with the result that it completely disintegrated.

*Example II*

A piece of white glass fabric was padded as described in Example I and then dried at 140° F. The dried fabric was then padded with a solution containing 5% of a polyethylene emulsion of 30% total solids (Eastman Polyethylene E). A material with a smooth flexible, and nonslippery hand was obtained. This treated fabric was then cured and dyed as outlined in Example I to give a dyed fabric with the same laundering characteristics as obtained above.

*Example III*

A sample of white glass fabric padded by immersing the fabric in a solution containing 1 part partially deacetylated chitin, 1 part glacial acetic acid, 1 part hexamethylene tetramine, and 97 parts of water was passed through squeeze rolls to remove excess solution and to give an even application. The fabric was then dried at 140° F. and padded with a 5% water solution of the previously described polyethylene emulsion. The fabric was then dyed at 160° F. for 10 minutes in a bath containing 1 part Direct Fast Red 8 BL, 5 parts sodium sulfate, and 94 parts water. The fabric was then rinsed with water and dried. A fabric was obtained with a good depth of shade and good color retention after a wash cycle in a rotary home laundry machine. The fabric showed insignificant distortion as a result of the washing cycle.

*Example IV*

A sample of white glass fabric was padded as outlined above with a solution containing 1 part partially deacetylated chitin, 1 part lactic acid, 5 parts of the previously described polyethylene emulsion, 1 part of monomethylol dimethyl hydantoin, and 92 parts of water. The padded fabric was then dried at 140° F. and cured at 275° F. for 5 minutes. The fabric was then dyed with Congo red as outlined in Example I. The dyed fabric showed the same dyeing characteristics as in Example I.

Following the procedure of any of the examples given, similar treating solutions and conditions may be employed using aqueous solutions containing about 90-95 parts water; 1-5 parts of the deacetylated undegraded chitin; and 1-5 parts of the acid which may be any acid which will form a salt and, in general, the class will include monobasic aliphatic acids, aromatic acids, hydroxy aliphatic and aromatic acids, and dicarboxylic aliphatic and aromatic acids. In general, the lower molecular weight acids are preferred.

As a softener useful for incorporation into the deacetylated chitin solution, or as an after treatment, the following typical one is useful.

| | Parts |
|---|---|
| Polyethylene (aqueous emulsion, resin content 30-40 percent) | 20 |
| Amine salt (fatty acid amine salt, e.g., tallow amine acetate) | 5-10 |
| Water | 60-70 |

The softener may be used as part of the deacetylated chitin solution, in which case it should replace about 10-30 percent of the solution.

Natural fibers are all of organic nature and inherently include reactive groups which are receptive to dyes. Thus, the problem of dyeing natural fibers is generally reducible to a rather specific chemical reaction and good products involving high degrees of color stability can be devised when the proper combination of dye and fiber is used. Similarly, synthetic fibers of an organic nature, although they offer greater problems in dyeing than do the natural ones, can be dyed with accurately controllable chemical manipulations. However, with the advent of glass fibers and well developed asbestos fibers, the problem of dyeing takes on an entirely new dimension, because the inorganic character of the fiber gives a physical structure different from natural fiber and also one of an entirely foreign chemical identity. That is, no naturally reactive dye centers are present.

Attempts to dye glass fibers using conventional dyes and conventional techniques have uniformly led to complete failure, because the dyes are merely superficially deposited physically and wash out simply by wetting with water. When this condition is coupled with virtual incapacity of mineral fibers to withstand laundering processes, it is apparent that some chemical alteration of the medium is necessary. It is for this purpose that deacetylated chitin has been found to be particularly advantageous because it is a material of an organic character. However, we have found that when deposited on glass fibers it apparently enters into some kind of surface chemical reaction which brings about not only a high degree of adhesion of the chitinous material to the inorganic structure, but also its presence alters the chemical nature of the superificial surface of the fiber, with the result that centers for dyeing are created. As indicated in the specific examples, the treated glass fibers become completely receptive to dyes of ordinary types with the result that the utility and potential utility of the glass fiber is greatly enhanced.

Not only is the film receptive to conventional natural fiber dyes, but it is also capable of entering into diazotizing and coupling reactions with specific agents, such as beta naphthol to give unique colors in shades and ranges not hitherto attainable.

The film of partially deacetylated but substantially undegraded chitin adheres to the glass fibers, and to other mineral fibers, such as asbestos, to form a clear transparent coating which is capable of taking a sufficient quantity of commercial dyestuff to produce fabrics in a wide range of colors, not hitherto attainable.

Conventional current practice of applying color to glass fibers involves dispersing the color pigment in a resin binder and subsequently applying the pigmented material to the fiber. Where a pattern is to be developed the practice produces a fabric having a hand in the colored areas different from that of the uncolored areas. Also, the pigmented resin systems are very limited in color range and intensity.

Accordingly, one of the distinct advantages of the method of this invention is that it makes possible the use of dyestuffs normally applied to natural fibers, i.e. cotton and wool, on the glass and mineral fibers. This result is achieved without detectable stiffening or change of hand of the glass fiber, dulling its color, or otherwise affecting its desirable esthetic properties.

In addition to the enhanced appearance of the fabric made possible, the distortion stability of the glass fabric is materially improved. Glass fabrics inherently must be handled with great care. Our treated glass fabrics tolerate substantially rougher washing than untreated fabrics.

What is claimed is:

1. A method of treating a woven glass fabric which comprises the steps of padding the fabric with an aqueous solution of a water soluble salt of a partially deacetylated chitin, the said chitin having a free amino group ratio of about 0.7 to 0.9 per chitosamine unit, separating excess solution therefrom to deposit a film in the amount of less than 1 percent of the glass on the surface of the fabric, drying the fabric, and subsequently heat-treating the fabric and the deposited film at a temperature in the range of 250° to 275° F.

2. The method in accordance with claim 1, in which said woven glass fabric is padded in an aqueous solution containing from about 1–5 percent by weight of deacetylated chitin and a salt forming acid in amount sufficient to form a salt with the deacetylated chitin.

3. The method in accordance with claim 1, in which the acid is an organic acid.

4. The method in accordance with claim 1, in which the acid is an inorganic acid.

5. The method in accordance with claim 1, in which the acid is acetic acid.

6. The method in accordance with claim 1, in which the acid is a formic acid.

7. The method in accordance with claim 1, in which the acid is glycolic acid.

8. The method in accordance with claim 1, in which the acid is lactic acid.

References Cited in the file of this patent

UNITED STATES PATENTS

| Number | Name | Date |
|---|---|---|
| 741,592 | Roberts | Oct. 13, 1903 |
| 1,636,511 | Hering | July 19, 1927 |
| 2,047,218 | Merrill | July 14, 1936 |
| 2,047,220 | Patterson et al. | July 14, 1936 |
| 2,047,226 | Rigby | July 14, 1936 |
| 2,442,196 | Coggeshall | May 25, 1948 |
| 2,493,845 | Zettel | Jan. 10, 1950 |
| 2,577,936 | Waggoner | Dec. 11, 1951 |
| 2,667,936 | Ferier | Jan. 26, 1954 |
| 2,722,489 | Hennessey et al. | Nov. 1, 1955 |
| 2,778,746 | Steinman et al. | Jan. 22, 1957 |